(12) United States Patent
Mulla et al.

(10) Patent No.: US 6,507,892 B1
(45) Date of Patent: Jan. 14, 2003

(54) L1 CACHE MEMORY

(75) Inventors: Dean A. Mulla, Saratoga, CA (US); Terry L Lyon, Fort Collins, CO (US); Reid James Riedlinger, Fort Collins, CO (US); Tom Grutkowski, Fort Collins, CO (US)

(73) Assignees: Hewlett-Packard Company, Palo Alto, CA (US); Intel Corporation, Santa Clara, CA (US)

( * ) Notice: Subject to any disclaimer, the term of this patent is extended or adjusted under 35 U.S.C. 154(b) by 0 days.

(21) Appl. No.: 09/510,285

(22) Filed: Feb. 21, 2000

(51) Int. Cl.[7] ............................................. G06F 13/00
(52) U.S. Cl. ...................... 711/131; 711/117; 711/119; 711/149
(58) Field of Search ................................ 711/117, 119, 711/131, 149

(56) References Cited

U.S. PATENT DOCUMENTS 5,623,628 A    4/1997  Brayton et al.

6,226,713 B1 *  5/2001  Mehrotra ................... 711/118

FOREIGN PATENT DOCUMENTS

SE        WO 98/13763   *  4/1998

* cited by examiner

Primary Examiner—Reba I. Elmore (57) ABSTRACT

The inventive cache processes multiple access requests simultaneously by using separate queuing structures for data and instructions. The inventive cache uses ordering mechanisms that guarantee program order when there are address conflicts and architectural ordering requirements. The queuing structures are snoopable by other processors of a multiprocessor system. The inventive cache has a tag access bypass around the queuing structures, to allow for speculative checking by other levels of cache and for lower latency if the queues are empty. The inventive cache allows for at least four accesses to be processed simultaneously. The results of the access can be sent to multiple consumers. The multiported nature of the inventive cache allows for a very high bandwidth to be processed through this cache with a low latency.

18 Claims, 5 Drawing Sheets

L1 CACHE MEMORY

RELATED APPLICATIONS

This application is related to co-pending and commonly assigned patent application Ser. No. 09/501,396 entitled "METHOD AND SYSTEM FOR EARLY TAG ACCESSES FOR LOWER-LEVEL CACHES IN PARALLEL WITH FIRST-LEVEL CACHE," co-pending and commonly assigned U.S. patent application Ser. No. 09/510,973 entitled "MULTILEVEL CACHE STRUCTURE AND METHOD USING MULTIPLE ISSUE ALGORITHM WITH OVER SUBSCRIPTION AVOIDANCE FOR HIGH BANDWIDTH CACHE PIPELINE," co-pending and commonly assigned U.S. patent application Ser. No. 09/510,283 entitled "CACHE CHAIN STRUCTURE TO IMPLEMENT HIGH BANDWIDTH LOW LATENCY CACHE MEMORY SUBSYSTEM," co-pending and commonly assigned U.S. patent application Ser. No. 09/510,279 entitled "CACHE ADDRESS CONFLICT MECHANISM WITHOUT STORE BUFFERS," and co-pending and commonly assigned U.S. patent application Ser. No. 09/507,333 entitled "MULTI-PORTED REGISTER STRUCTURES WITH A PULSE WRITE MECHANISM," the disclosures of which are hereby incorporated herein by reference.

TECHNICAL FIELD

This invention relates in general to computer systems, and in specific to an arrangement for a cache memory system.

BACKGROUND

Computer systems may employ a multi-level hierarchy of memory, with relatively fast, expensive but limited-capacity memory at the highest level of the hierarchy and proceeding to relatively slower, lower cost but higher-capacity memory at the lowest level of the hierarchy. The hierarchy may include a small fast memory called a cache, either physically integrated within a processor or mounted physically close to the processor for speed. The computer system may employ separate instruction caches and data caches. In addition, the computer system may use multiple levels of caches. The use of a cache is generally transparent to a computer program at the instruction level and can thus be added to a computer architecture without changing the instruction set or requiring modification to existing programs.

Computer processors typically include cache for storing data. When executing an instruction that requires access to memory (e.g., read from or write to memory), a processor typically accesses cache in an attempt to satisfy the instruction. Of course, it is desirable to have the cache implemented in a manner that allows the processor to access the cache in an efficient manner. That is, it is desirable to have the cache implemented in a manner such that the processor is capable of accessing the cache (i.e., reading from or writing to the cache) quickly so that the processor may be capable of executing instructions quickly. Caches have been configured in both on chip and off-chip arrangements. On-processor-chip caches have less latency, since they are closer to the processor, but since on-chip area is expensive, such caches are typically smaller than off-chip caches. Off-processor-chip caches have longer latencies since they are remotely located from the processor, but such caches are typically larger than on-chip caches.

A prior art solution has been to have multiple caches, some small and some large. Typically, the smaller caches would be located on-chip, and the larger caches would be located off-chip. Typically, in multi-level cache designs, the first level of cache (i.e., L0) is first accessed to determine whether a true cache hit for a memory access request is achieved. If a true cache hit is not achieved for the first level of cache, then a determination is made for the second level of cache (i.e., L1), and so on, until the memory access request is satisfied by a level of cache. If the requested address is not found in any of the cache levels, the processor then sends a request to the system's main memory in an attempt to satisfy the request. In many processor designs, the time required to access an item for a true cache hit is one of the primary limiters for the clock rate of the processor if the designer is seeking a single-cycle cache access time. In other designs, the cache access time may be multiple cycles, but the performance of a processor can be improved in most cases when the cache access time in cycles is reduced. Therefore, optimization of access time for cache hits is critical for the performance of the computer system.

Prior art cache designs for computer processors typically require "control data" or tags to be available before a cache data access begins. The tags indicate whether a desired address (i.e., an address required for a memory access request) is contained within the cache. Accordingly, prior art caches are typically implemented in a serial fashion, wherein upon the cache receiving a memory access request, a tag is obtained for the request, and thereafter if the tag indicates that the desired address is contained within the cache, the cache's data array is accessed to satisfy the memory access request. Thus, prior art cache designs typically generate tags indicating whether a true cache "hit" has been achieved for a level of cache, and only after a true cache hit has been achieved is the cache data actually accessed to satisfy the memory access request. A true cache "hit" occurs when a processor requests an item from a cache and the item is actually present in the cache. A cache "miss" occurs when a processor requests an item from a cache and the item is not present in the cache. The tag data indicating whether a "true" cache hit has been achieved for a level of cache typically comprises a tag match signal. The tag match signal indicates whether a match was made for a requested address in the tags of a cache level. However, such a tag match signal alone does not indicate whether a true cache hit has been achieved.

As an example, in a multi-processor system, a tag match may be achieved for a cache level, but the particular cache line for which the match was achieved may be invalid. For instance, the particular cache line may be invalid because another processor has snooped out that particular cache line. As used herein a "snoop" is an inquiry from a first processor to a second processor as to whether a particular cache address is found within the second processor. Accordingly, in multi-processor systems a MESI signal is also typically utilized to indicate whether a line in cache is "Modified, Exclusive, Shared, or Invalid." Therefore, the control data that indicates whether a true cache hit has been achieved for a level of cache typically comprises a MESI signal, as well as the tag match signal. Only if a tag match is found for a level of cache and the MESI protocol indicates that such tag match is valid, does the control data indicate that a true cache hit has been achieved. In view of the above, in prior art cache designs, a determination is first made as to whether a tag match is found for a level of cache, and then a determination is made as to whether the MESI protocol indicates that a tag match is valid. Thereafter, if a determination has been made that a true tag hit has been achieved, access begins to the actual cache data requested.

Figure 6:
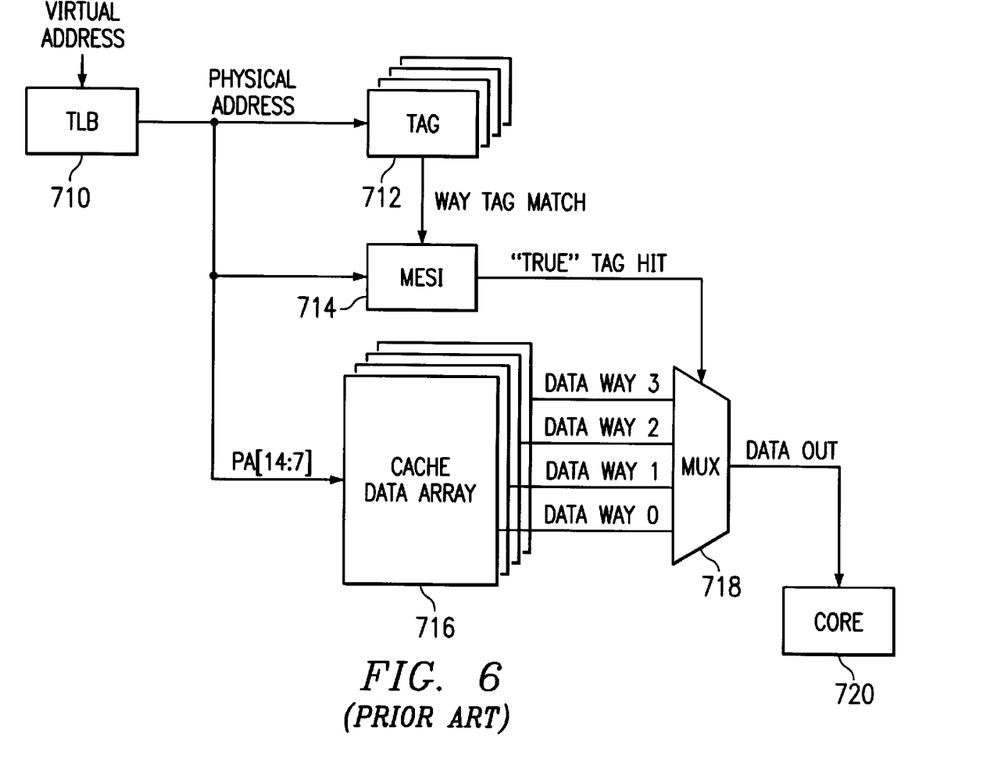
FIG. 6 depicts a prior art arrangement for a cache structure.

Turning to FIG. 6, an example of a typical cache design of the prior art is shown. Typically, when an instruction requires access to a particular address, a virtual address is provided from the processor to the cache system. As is well-known in the art, such virtual address typically contains an index field and a virtual page number field. The virtual address is input into a translation look-aside buffer ("TLB") 610. TLB 610 is a common component of modem cache architectures that is well known in the art. TLB 610 provides a translation from the received virtual address to a physical address. Within a computer system, the virtual address space is typically much larger than the physical address space. The physical address space is the actual, physical memory address of a computer system, which includes cache, main memory, a hard drive, and anything else that the computer can access to retrieve data. Thus, for a computer system to be capable of accessing all of the physical address space, a complete physical mapping from virtual addresses to physical addresses is typically provided.

Once the received virtual address is translated into a physical address by the TLB 610, the index field of such physical address is input into the cache level's tag(s) 612, which may be duplicated N times for N "ways" of associativity. As used herein, the term "way" refers to a partition of the cache. For example, the cache of a system may be partitioned into any number of ways. Caches are commonly partitioned into four ways. The physical address index is also input to the cache level's data array(s) 616, which may also be duplicated N times for N ways of associativity.

From the cache level's tag(s) 612, a way tag match signal is generated for each way. The way tag match signal indicates whether a match for the physical address was made within the cache level's tag(s) 612. As discussed above, in multi-processor systems, a MESI protocol is typically utilized to indicate whether a line in cache is modified and exclusive, shared, or invalid. Accordingly, in such multi-processor systems the MESI protocol is combined with the way tag match signal to indicate whether a "true" tag hit has been achieved for a level of cache. Thus, in multi-processor systems a true tag hit is achieved when both a tag match is found for tag(s) 612 and the MESI protocol indicates that such tag match is a valid match. Accordingly, in FIG. 6, MESI circuitry 614 is utilized to calculate a "true" tag hit signal to determine whether a true tag hit has been achieved for that level of cache. Once it is determined from the MESI 614 that a "true" tag hit has been achieved for that level of cache, then that cache level's data array(s) 616, which may also be duplicated N times for N ways of associativity, are accessed to satisfy the received memory access request. More specifically, the true tag hit signal may be used to control a multiplexer ("MUX") 618 to select the appropriate data array way to output data to satisfy the received memory access request. The selected data from data array(s) 616 is output to the chip's core 620, which is the particular execution unit (e.g., an integer execution unit or floating point execution unit) that issued the memory access request to the cache.

In view of the above, prior art caches are typically implemented in a serial fashion, with each subsequent cache being connected to a predecessor cache by a single port. Thus, prior art caches have been only able to handle limited numbers of requests at one time. Therefore, the prior art caches have not been able to provide high enough bandwidth back to the CPU core, which means that the designs of the prior art increase latency in retrieving data from cache, which slows the execution unit within the core of a chip. That is, while an execution unit is awaiting data from cache, it is stalled, which results in a net lower performance for a system's processor.

SUMMARY OF THE INVENTION

These and other objects, features and technical advantages are achieved by a system and method which uses an L1 cache that has multiple ports. The inventive cache uses separate queuing structures for data and instructions, thus allowing out-of-order processing. The inventive cache uses ordering mechanisms that guarantee program order when there are address conflicts and architectural ordering requirements. The queuing structures are snoopable by other processors of a multiprocessor system. This is required because the tags are before the queues in the pipeline. Note that this means the queue contains tag state including hit/miss information. When a snoop is performed on the tags, if it is not also performed on the queue, the queue would believe it has a hit for a line no longer present in the cache. Thus, the queue must be snoopable by other processors in the system.

The inventive cache has a tag access bypass around the queuing structures, to allow for speculative checking by other levels of cache and for lower latency if the queues are empty. The inventive cache allows for at least four accesses to be processed simultaneously. The results of the access can be sent to multiple consumers. The multiported nature of the inventive cache allows for a very high bandwidth to be processed through this cache with a low latency.

It is a technical advantage of the invention to be able to have at least four accesses at a time going out to the data arrays.

It is another technical advantage to allow the L1 cache to return results to as many consumers as needed, independently of one another.

It is a further technical advantage of the invention to have the tags before the queuing structure. This achieves lower latencies from the cache because tag results can be sent directly to the cache, thereby skipping the queuing structures.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
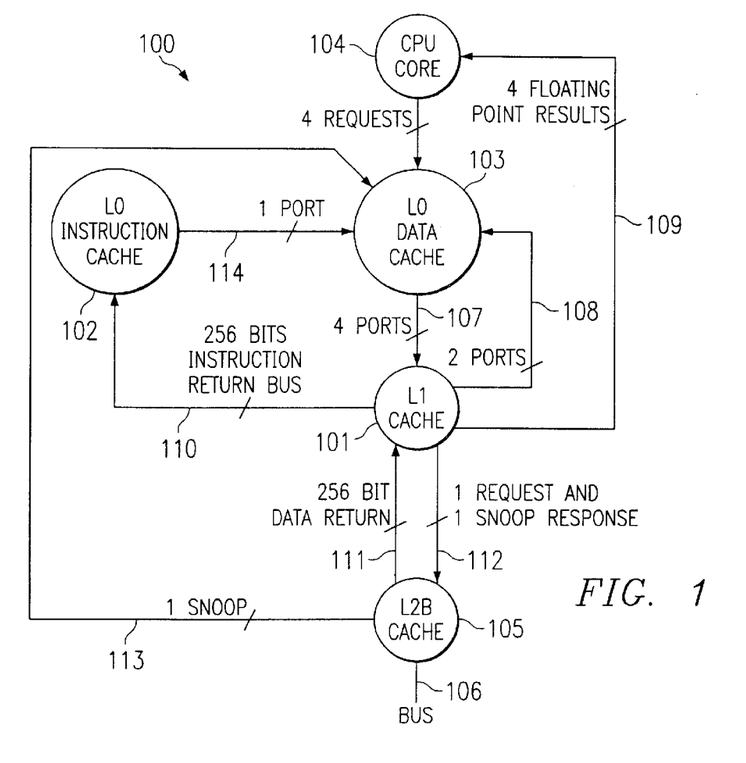
FIG. 1 is a block diagram depicting the inventive cache arrangement.

FIG. 1 is a block diagram depicting the arrangement 100 of the L1 cache 101 with the L0 instruction cache 102, L0 data cache 103, CPU 104, and the L2 cache 105 and the information pathways between the caches, CPU 104, and system bus 106.

The L1 cache 101, which is a combined data and instruction cache, receives access requests from the L0 data cache 103. Included in that L1 cache are queuing structures that hold the tags and the data for information stored in the cache. The L1 cache is configured to be able to receive, every clock cycle, 4 accesses or access requests from the L0 data cache, via 4 ports 107. The accesses may be stores or loads. A store is a memory access request desiring to write data to cache. A load is a memory access request desiring to read data from the cache. L1 cache uses a pipeline and two queues to manage the access requests. The accesses can be pulled from the pipeline or the queues for processing. The L1 cache may supply up to two integer results per clock, via two ports 108, to the L0 data (L0d) cache 103. These integer results may be sent by the L0d cache to the integer general registers in the CPU core 104. The L1 cache can also supply up to 4 floating point results per clock, via four ports 109, directly to the floating point registers of the CPU core 104. The L1 cache can also send 256 bits of instruction data to the L0i cache via return bus 110. The interfaces permit the L1 cache to communicate with the other caches, CPU, and other elements coupled to the bus 106. Bus 113 provides multi-processor support, by allowing snoop requests from other processors to access the L0 cache. Note that a snoop request will be passed onto L1 cache as if the snoop was a CPU request.

Path 114, between L0 instruction cache and L0 data cache, is for instruction fetch requests that have missed the L0 instruction cache. The L0i cache makes a request of the L0 data cache for a line of memory containing instructions to execute. The L0 data cache utilizes an unused one of the 4 ports 107 to send the instruction request to the L1 cache 101.

Path 112 is actually 2 paths. The request part of path 112 is used for sending data or instruction accesses to the L2 cache 105. These requests may be speculatively sent, i.e. before knowledge of an access miss of the L1 cache in order to minimize the latency of accessing the L2 cache. The L2 provides a full line of data in 4 clocks over the data return bus 111 to the L1 cache 101. The L1 cache fills the full line of data into the L1 cache and can bypass the result to the necessary consumer which could be any of 102, 103, or 104. The other path of path 112 is the snoop response path. For a snoop of the L1 cache, the L1 provides a report to the L2/Bus Cluster regarding the status of the line in the L1 cache. This result is provided utilizing the snoop response path part of path 112.

Note that instruction return bus 110, new access ports 107, integer return ports 108, and fp return ports 109, L2 request port 112, and data return bus 111 can all be active at the same time with some restrictions. The biggest restriction is on the fp return ports 109, integer return ports 108, and instruction return ports 110. There are several possible maximal combinations of activity that can be supported. The limitations are based upon the 4 access per clock limitation for data accesses, and the array limitations of only being able to supply 512 bits per clock, and the oversubscribe logic which can alleviate resource conflict blockages to some extent. The possible simultaneous port usage from L1 return ports 109, 108, and 110, is as follows:

| FP Ports | Integer Ports | Instruction |
|---|---|---|
| 2 | 2 | yes |
| 4 | 0 | yes |
| 4 | 2 | no |

Note that the two integer ports with the four fp ports are really using the integer ports to send a line of data to the L0d cache.

The arrangement 100 would operates as follows. For example, the CPU 104 issues an integer load type instruction, which is sent to the L0 data cache and to the L1 cache in parallel. The tags of each cache are accessed in parallel. Note that the tags of the L1 cache are being accessed speculatively, in other words assuming that the L0 data cache does not have the data and will miss. If the L0 data cache does miss, then the L1 will use the results of that speculative tag access to determine if it has the data or not. If the L0 data cache does have the requested data, then the L0 will return the data to the CPU core register file, and the L1 will halt accessing, even though it has speculatively accessed the tags and may have also speculatively accessed the data. The L0 data cache sends a signal to the L1 cache to inform the L1 cache of a hit or miss. If the L0 data cache has a miss, and the L1 cache has a hit, then the integer data is returned to the L0 data cache 103, via ports 108. The data could be used in moving a line of data up to the L0 data cache, or sent to, via the L0 data cache, to the CPU core integer register file, or both.

After the L1 cache receives the speculative request from the L0 cache, the L1 cache sends a speculative request to the L2 cache. If the L1 cache misses, then the L1 cache allocates a line in its array, in anticipation of a data return from L2 cache. Note that bus 112, which carries the speculative request to the L2 cache is a single port bus, capable of carrying one request per clock cycle, so priority select structures are used to connect the appropriate L2 cache structures to the bus. If the L2 cache has the data, and assuming that the L0 cache and the L1 cache do not, then the L2 cache will send that data back to the L1 cache. The L1 cache will fill that data into the L1 cache. First, it buffers up an entire line, including the requested data, and then it writes the line into the L1 cache array. In parallel with the buffering, the cache also sends the requested data to the L0 data cache, and/or the CPU core. If the L2 misses, the L2 uses its BRQ structure, or Bus Request Queue, to send a request onto the processor interface memory bus 106 or system bus. This request will retrieve a line from RAM memory. Note that the L2 cache may be larger than the L1 cache, and the L1 cache may be larger then the combination of L0 instruction cache and L0 data cache. Also note that the L0 cache is split so that the relevant portions are located closer to the processor consumer components that use the respective cache portions, thereby reducing latency. Further note that L0, L1 and L2 may all be located on the processor chip to reduce latency.

Figure 2A:
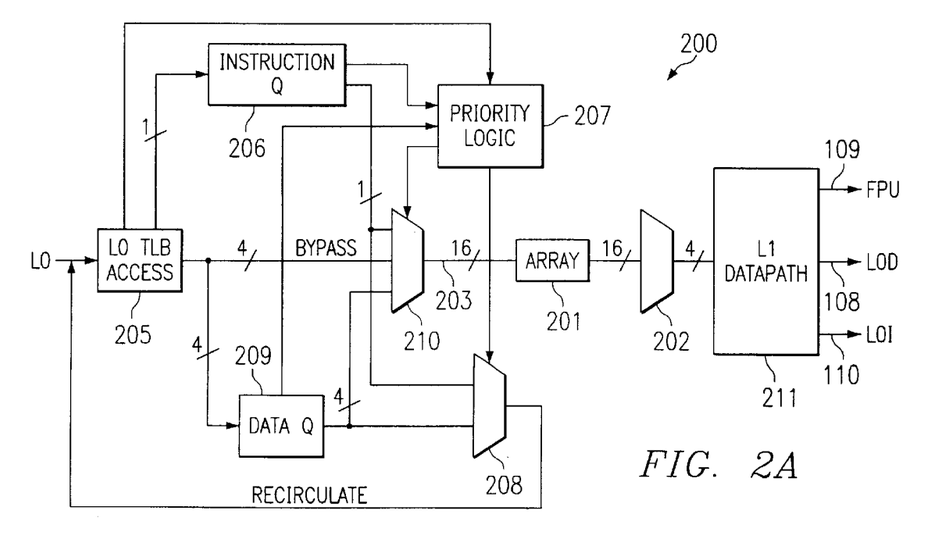
FIGS. 2A–2C depict the internal elements of the L1 cache of FIG. 1.

FIG. 2A depicts the arrangement 200 of elements of the L1 cache 101 of FIG. 1 used in managing a load access or instruction fetch from the L0 cache. The pipeline stages for an access that flows through to access the L1 tags are L0M, L0D, and L0W. The pipeline stages for an access that flows through to access the L1 cache are L1N, L1I, L1A, L1M, L1D, L1C, and L1W. This flow arrangement 200 begins with the tag access and ends with the return of the result (data) to the L0 cache or to the CPU. An access, including the physical address, is sent from the L0 data cache to the L1 cache, wherein the tags are accessed 205 to determine if there is a hit. Note that block 205 combines the L0d cache and the TLB. The L1 cache tags are not inside block 205. They could be drawn as a separate box parallel to L0d cache/TLB 205. Then, the tags would be accessed in parallel to 205, and 205 would show an output (physical address) feeding the L1 tags to finalize the tag hit information. Further note that this is true for both data and instruction accesses. If there is a hit, the access is sent to either the instruction queue 206 or the data queue 209. The instruction queue holds up to eight entries until they are completed or passed on to the L2 cache. The data queue 209 holds up to thirty two entries until they are completed or passed on to the L2 cache. The queues are split to prevent priority problems between the instructions and data. Entries that are issued out of each queue, but which are not processed through MUX 210 are recirculated by MUX 208 back to the L1 tag access 205 stage for re-entry back into their respective queues.

Figure 3A:
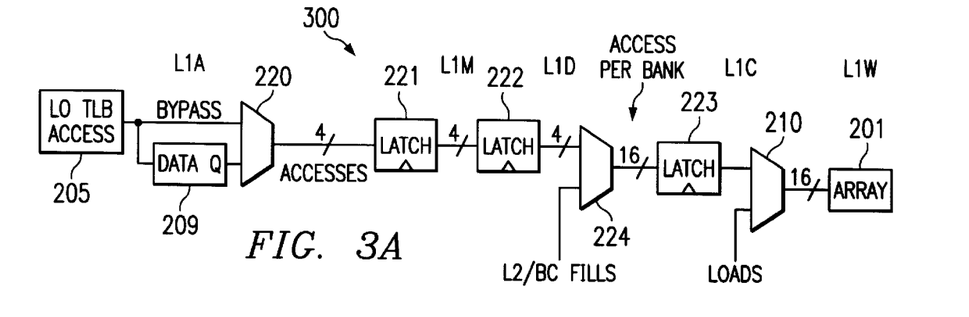
FIGS. 3A and 3B depict the internal elements of the L1 cache of FIG. 1 used in a store operation.

Priority logic 207 controls the MUX 210, and thereby chooses one of the data queue 209 (up to four locations) and the instruction queue 206 as providing the source of the location for the array 201. MUX 210 may also select from the L1 tag access 205, thereby bypassing the queues. A bypass is selected when nothing 'better' is available to choose, i.e. if there is an access the data or the instruction queue have to process, that will be done instead of the bypass. This is good because it helps do things in program order, and because the bypasses are speculative, i.e. these accesses may be able to have their data provided by the L0d cache. The priority logic uses information about what each of the queues will issue next and determines which information has priority, and selects the higher priority source. Note that MUX 210 is cascaded or multi-leveled MUX, but is shown as a single level MUX for simplicity. The output of the MUX 210 is used as control information in selecting the locations to read in the array 201. The control information comprises an address or index, way, and read/write (load/store) information. Note that the output from MUX 210 has 16 buses, one for each of 16 banks of the array. The desired bit line is read out from the array 201, and mapped onto the four port buses by MUX 202. The bit line is sent through the L1 data path 211 to one of three consumers, the CPU via floating point result buses 109, the L0 data cache via two port buses 108, or the L0 instruction cache via return bus 110. Note that store requests are processed in a similar manner, as shown in FIG. 3A.

Figure 2B:
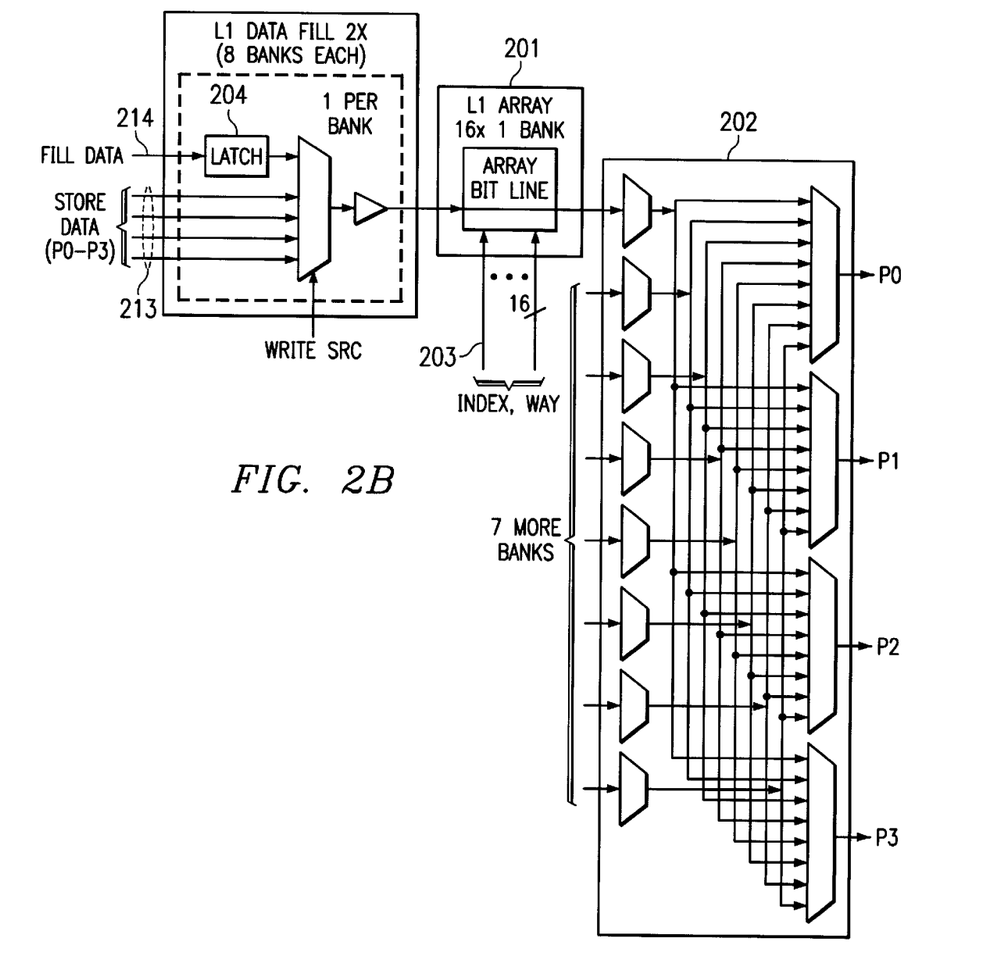

FIG. 2B depicts a block diagram of the internal arrangement for the array 201 and the MUX 202. The array 201 comprises 16 banks, only one of which is shown for simplicity. Each bank is connected to one of the 16 bus 203 input from MUX 210 of FIG. 2A. The buses 203 select the proper bit lines for reading the information out of the array 201. The information on the buses comprises 7 index or address bits, 8 way bits, a read enable bit, and a write enable bit. MUX 202 is comprised of four 16 to 1 muxes that maps the information from the 16 banks of the array onto the four output ports P0–P3.

Figure 2C:
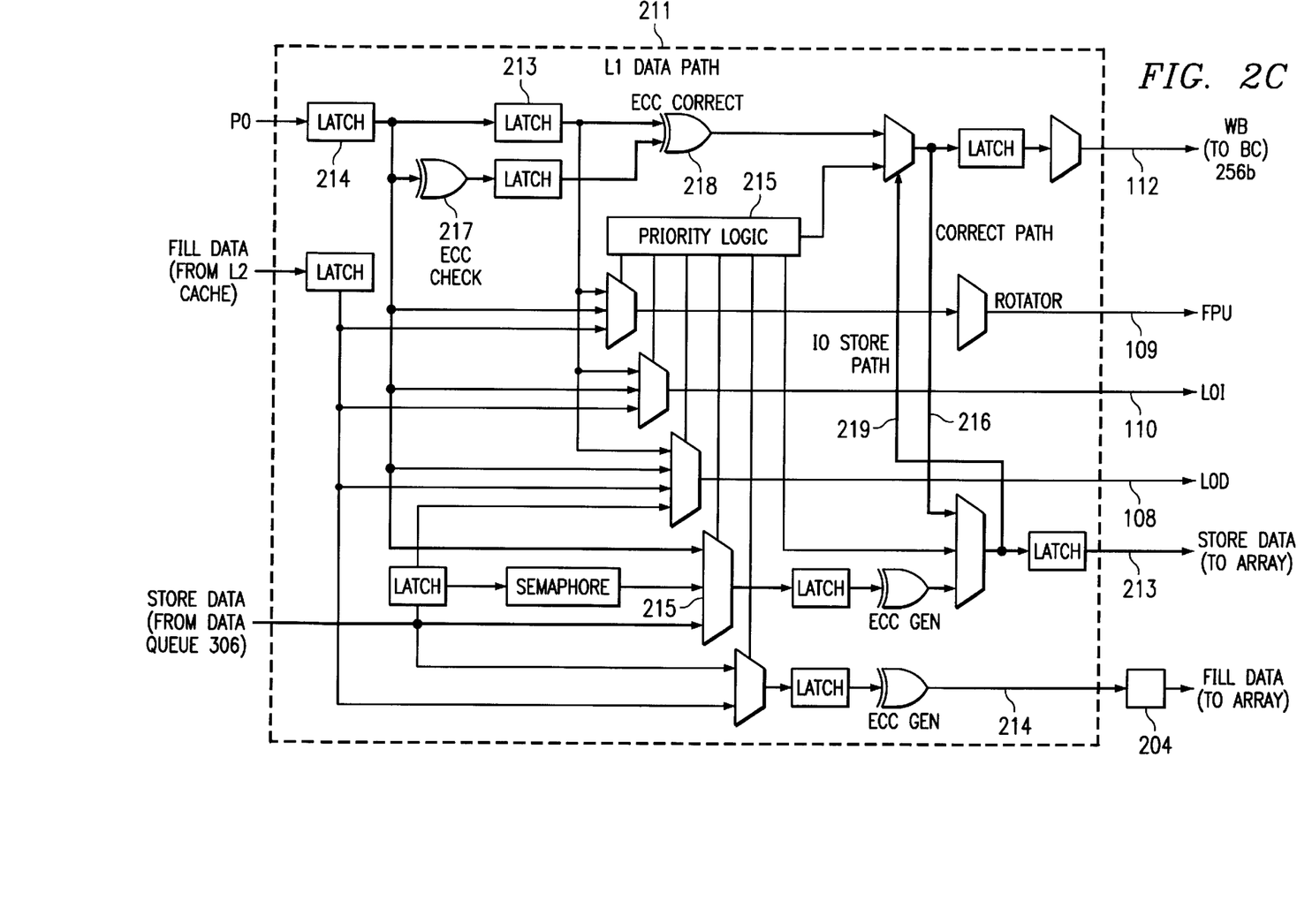

The circuitry of FIG. 2C is replicated three more times, for P1, P2, and P3. The L1 data path circuit routes the information to the proper place. For example, the P0–P3 information could be routed to the bus cluster (bc) for writing data back to main memory, via bus 106 and port bus 112. Data transfers to the L2 cache would also be sent via port bus 112. The P0–P3 information could also be sent to the floating point unit, via port 109, to the L0 instruction cache, via port 110, or the L0 data cache, via port 108. Priority logic 215 is connected to the MUXs to control the destination of the data. Note that the data can be sent to more than one consumer, e.g. to the floating point unit and the L0 data cache, however, the data can be taken from only one source, i.e. P0–P3, fill, or store. The L1 data path circuit also uses latches to maintain proper state during data movement, and also uses ECC to detect and correct errors in the data. The data path circuit use a rotator to support both little endian and big endian register file formats for the CPU. For example, the number 23 may be stored as 23 (little endian)or 32.(big endian). Data sent to the L0 cache does not require rotation, as it has its own rotator for sending information to the CPU. L1 data path also supports semaphore operations, which are atomic read/modify/write operations, meaning that the operations cannot be snooped or otherwise interrupted.

Note that latches 213 and 214 allow two cycles of data to be used, the oldest data is stored in latch 213 and the youngest is stored in latch 214. Both latches are connected to the MUXs that feed the FPU port 109, L0 instruction port 110, and the L0 data port 108. Thus, two cycles of data can be sent to these consumers. Latch 214 is connected to the MUX that feeds the store data port 213. IO store path 219 allows store data to be sent to the L2 cache or to the bus cluster.

Note that portions of FIGS. 2A–2C are used in store/fill operations. A store operation is where information is written into the cache array as a result of a store command or instruction. A fill operation is where information is moved up from the L2 cache or down from the L0 cache into the L1 cache. Fill data is typically a cache line of data sent in response to a request. Note that ECC (error correction code) is generated for both the fill and store information, and is also written into the array. A store can comprise more or less than the width of a cache bank in size. For example, a cache bank is 128 bits in width, and a write operation can write as small as a 32 bit chunk of memory, without disturbing the other 96 bits of that bank. This increases performance because no other steps are needed for 32- or 64-bit writes. Chunks smaller than 32 bits, can be written, e.g. 8 or 16 bits, but for writes that small the difference between 32 bits must be read out and merged with the store. In other words, a small store includes both a load and a store. For example, storing 8 bits requires another 24 bits to be read out and merged with the 8 bits to form a total of 32 bit for the write operation. MUX 215 facilitates the reading out of additional bits from P0–P3 and the merging.

The L1 data path also includes correction path 216. The path allows for later correction of a detected error. Thus, only data with errors will pass through correction. By implementing late correction, error free data is not slowed by having to pass through correction. Error free data will pass from latch 214 (or latch 213) to one or more of the output ports 108, 109, 110, 112, 213, and/or 214, via an appropriate MUX. Data with errors, after detection by ECC check 217, is latched and then corrected by ECC error correct 218. The corrected data is then stored in the array via path 213. On a subsequent operation, the now corrected data can be read out of the array and sent to one or more of the output ports 108, 109, 110, 112, 213, and/or 214. Thus, error data is penalized greatly, while error free data is not penalized.

FIG. 3A depicts the address information path for a store operation. This flow arrangement 300 begins with the tag access and ends with storing the data to the memory array of the L1 cache 201. An access, including the physical address, is sent from the L0 data cache to the L1 cache, wherein the tags are accessed circuit 205 to determine if there is a hit. If there is a hit, the access is sent to either the instruction queue 206 or the data queue 209.

Priority logic (not shown) controls the MUX 220, and thereby chooses one of the data queue 209 or the bypass as the source of the address information. The address information comprises an address or index, way, and read/write (load/store) information. Note that up to four access can be handled in the same cycle. The latches 221, 222, 223 are used for timing purposes in moving the data along the pipeline. MUX 224 permits addresses for fills to be brought in from port 111. MUX 210 is the same MUX as in FIG. 2A. The selected address is used as the address for the store into the array 201.

The MUX 210 is used for selecting the following: data Q accesses (from 209, FIG. 2A); instruction accesses (from 206, FIG. 2A); bypass accesses (from 107/205); store accesses (from 223 and 224); and fill accesses (from 223 and 224). Note that the store/fill accesses are not shown in FIG. 2A because of complexity, however FIGS. 2A and 3A could be combined into a single FIGURE. Note that the loads and stores originates at port 107. MUX 210 is really the combination of the MUXs in FIGS. 2A and 3A.

Note that there is a window between the stores and loads. Because some stores also do loads, stores cannot write their data to the memory array until they have been combined with load data and have had new ECC generated. Thus, the stores cannot occur until 3 pipe stages after the earliest time a load could be done. Loads are allowed to issue before stores, since this would penalize loads and force them to wait until a store would be done. (Note that this would also complicate small stores, which are stores that need to be combined with load data and have ECC generated.) Thus, loads are allowed to access the data arrays as soon as they possibly can, and stores are made to update the array as soon as the slowest store possibly can. The slowest store is a small store that must be combined with a load before generating ECC. Therefore, there are 3 clocks between the pipeline stage of a load and that of a store impacting the array. This is why there are the extra pipeline latches 221, 222, 223 shown in FIG. 3A.

Figure 3B:
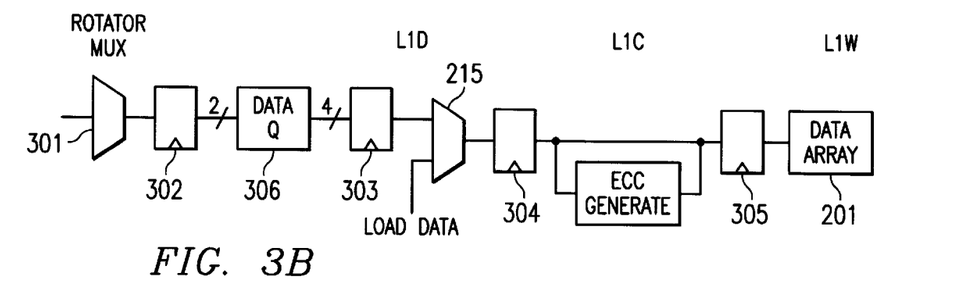

FIG. 3B depicts the flow of data in a store operation. This flow begins with rotator MUX 301, which puts the register file data into memory format. The latches 302, 303, 304, 305 are used to maintain timing in the pipeline. After rotation, the data is placed into data queue 306, which is different from data queue 209. Data queue 209 holds an address, while data queue 306 hold the data to be associated with the address. Note that a maximum of 2 stores per cycle are received, but a total of 4 accesses total per cycle may be received. Thus, the MUX/latch/queue 301, 302, and 306 are designed to only accept 2 accesses per clock, the specific 2 stores possible per clock. MUX 215 allows for data loaded for a read/modify/write operation from P0–P3 to be stored. ECC is generated for the data, which is then stored into the array 201 along with the data.

Figure 4:
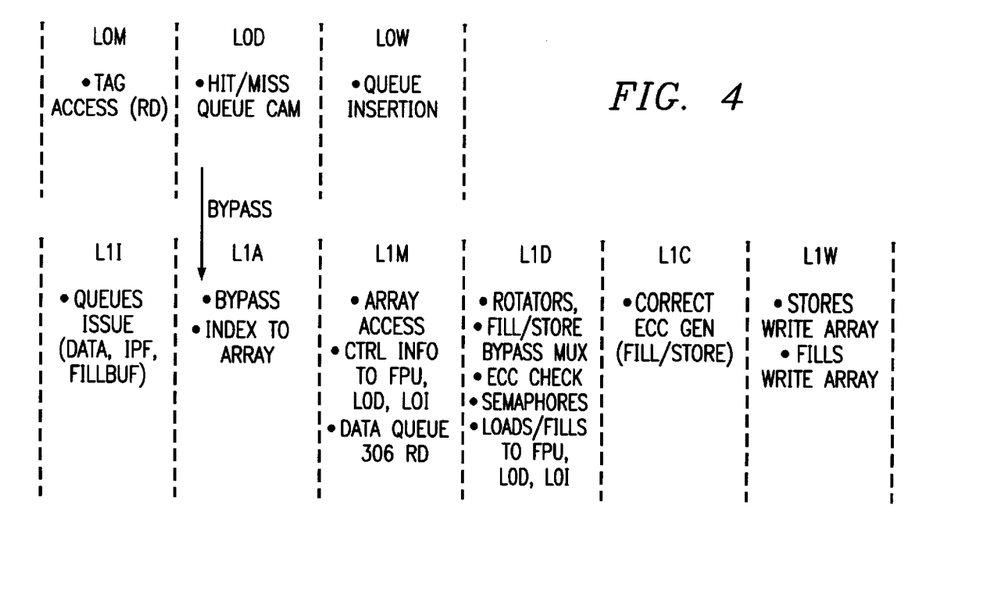
FIG. 4 is a flow diagram depicting the pipeline operations of the L1 cache.

FIG. 4 depicts the two pipelines involved in the load/store operations of the L1 cache. Note that the bypass of FIG. 4 is the same as that of FIG. 2A.

Figure 5:
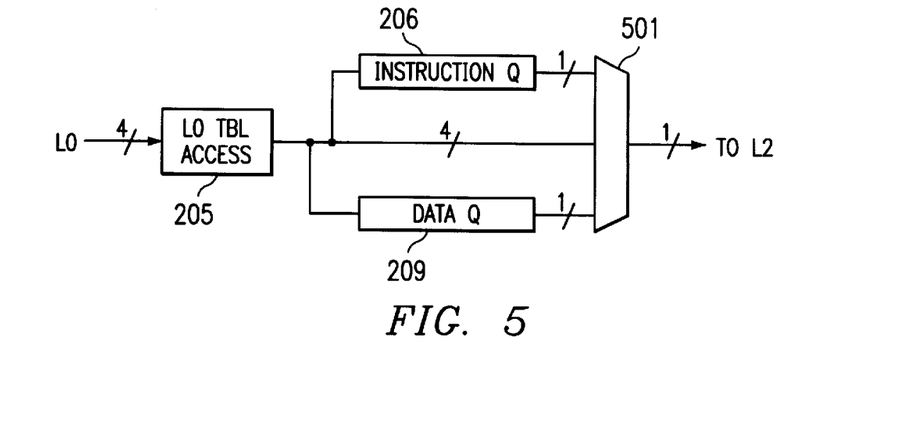
FIG. 5 depicts the internal elements of the L1 during a miss in the L1 tag access.

FIG. 5 depicts the flow when a miss occurs in the L1 tag access 205, which occurs in parallel with the TLB (translation look aside buffer) access from the L0 cache. Upon a miss, the location of the access, e.g. in one of the queue, is selected by MUX 501 to be sent to L2 cache. If there is nothing in the queues, then whatever is the access circuit 205 is speculatively sent to the L2, before the tag check has completed. The speculative nature allows for parallel look up to occur, i.e. the L1 tag look up is occurring while the L2 lookup is occurring. Note that the TLB, which translates the virtual addresses into physical addresses, is located in the L0 cache.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer system comprising:
   a processor that executes instructions; and
   a multi-level cache structure accessible by said processor to satisfy memory access requests, wherein said multi-level cache structure is configured to receive multiple memory access requests, process the multiple requests in parallel to determine whether one of said multiple levels is capable of satisfying the multiple received memory access requests;
   wherein the multi-level cache structure comprises:
      tag access logic that compares the addresses of each request with tags of information stored in the cache structure to determine whether there is a match; and
      a queue for holding address information for data accesses that have been processed by the tag access logic; and
      an address selection multiplexer for selecting between the tag access logic and the queue to provide the addresses for accessing a storage array of the cache structure.

2. The computer system of claim 1 wherein at least one access is a load access request for floating point data, and the multi-level cache structure further comprises:
   logic for reading the floating point data from the array using the address of the request; and
   logic for routing the read floating point data to the processor.

3. The computer system of claim 1 wherein the array resides in one cache level of the multi-level cache structure, and at least one access is a load access request for integer data, and wherein the multi-level cache structure further comprises:
   logic for reading the integer data from the array using the address of the request; and
   logic for routing the read floating point data to another cache level of the multi-level cache structure.

4. The computer system of claim 1 wherein the array resides in one cache level of the multi-level cache structure, and at least one access is an instruction access request, and wherein the multi-level cache structure further comprises:

logic for reading the instruction from the array using the address of the request; and logic for routing the instruction to another cache level of the multi-level cache structure.

5. The computer system of claim 1 wherein at least one access is a store access request, and wherein the multi-level cache structure further comprises:

a data buffer for holding data associated with the store data request; and logic for reading the data from the data buffer, routing the data to the array, and writing the data into the array at a location identified by the address of the store access request.

6. The computer system of claim 1 wherein the array resides in one cache level of the multi-level cache structure, and at least one access is a fill access request, and wherein the multi-level cache structure further comprises:

a data buffer for holding data associated with the fill data request; and logic for reading the data from the data buffer, routing the data to the array, and writing the data into the array at a location identified by the address of the fill access request.

7. The computer system of claim 1 wherein:

the processing of the multiple requests is performed in a pipeline.

8. A method of accessing a multi-level cache of a computer system that includes a processor, the method comprising the steps of:

receiving multiple memory access requests into a multi-level cache structure;

processing the multiple requests in parallel to determine whether one of said multiple levels is capable of satisfying the multiple received memory access requests, and if determined that at least one of the memory access requests can be satisfied by a level of the multi-level cache structure, then satisfying the one memory access request by the level of the multi-level cache structure;

comparing the addresses of each request with tags of information stored in the cache structure to determine whether there is a match via tag access logic;

holding address information for accesses that have been processed by the step of comparing in a queue; and selecting between the tag access logic and the queue to provide the addresses for accessing a storage array of the cache structure.

9. The method of claim 8 wherein at least one access is a load access request for floating point data, and the method further comprises the steps of:

reading the floating point data from the array using the address of the request; and routing the read floating point data to the processor.

10. The method of claim 8 wherein the array resides in one cache level of the multi-level cache structure, and at least one access is a load access request for integer data, and wherein the method further comprises the steps of:

reading the integer data from the array using the address of the request; and routing the read floating point data to another cache level of the multi-level cache structure.

11. The method of claim 8 wherein the array resides in one cache level of the multi-level cache structure, and at least one access is an instruction access request, and wherein the method further comprises the steps of:

reading the instruction from the array using the address of the request; and routing the instruction to another cache level of the multi-level cache structure.

12. The method of claim 8 wherein at least one access is a store access request, and wherein the method further comprises the steps of:

holding data associated with the store data request in a data buffer;

reading the data from the data buffer;

routing the data to the array; and writing the data into the array at a location identified by the address of the store access request.

13. The method of claim 8 wherein the array resides in one cache level of the multi-level cache structure, and at least one access is a fill access request, and wherein the method further comprises the steps of:

holding data associated with the fill data request in a data buffer;

reading the data from the data buffer;

routing the data to the array; and writing the data into the array at a location identified by the address of the fill access request.

14. The method of claim 8 wherein:

the step of processing of the multiple requests is performed in a pipeline.

15. A computer system comprising:

a processor that executes instructions;

means for receiving multiple memory access requests into a multi-level cache structure;

means for processing the multiple requests in parallel to determine whether one of said multiple levels is capable of satisfying the multiple received memory access requests, and if determined that at least one of the memory access requests can be satisfied by a level of the multi-level cache structure, then satisfying the one memory access request by the level of the multi-level cache structure;

means for comparing the addresses of each request with tags of information stored in the cache structure to determine whether there is a match; and means for holding address information for accesses that have been operated on by the means for comparing; and means for selecting between the means for comparing and the means for holding to provide the addresses for accessing a storage array of the cache structure.

16. The computer system of claim 15, wherein at least one access is a load access request for data, and the system further comprises:

means for reading the data from the array using the address of the request; and means for routing the read data to a consumer.

17. The computer system of claim 15, wherein at least one access is a write access request, and wherein the system further comprises:

means for holding data associated with the write request in a data buffer;

means for reading the data from the data buffer;

means for routing the data to the array; and means for writing the data into the array at a location identified by the address of the write access request.

18. The computer system of claim 16 wherein said load access request for data comprises a load access request for floating point data;

wherein said means for reading the data from the array comprises means for reading the floating point data from the array using the address of the request; and wherein said means for routing the read data to the consumer comprises means for routing the read floating point data to the consumer.

* * * * *